US011997666B2

(12) United States Patent
Gao et al.

(10) Patent No.: US 11,997,666 B2
(45) Date of Patent: May 28, 2024

(54) METHOD, DEVICE AND COMPUTER STORAGE MEDIUM FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 17/800,671

(22) PCT Filed: Feb. 19, 2020

(86) PCT No.: PCT/CN2020/075863
§ 371 (c)(1),
(2) Date: Aug. 18, 2022

(87) PCT Pub. No.: WO2021/163923
PCT Pub. Date: Aug. 26, 2021

(65) Prior Publication Data
US 2023/0354289 A1 Nov. 2, 2023

(51) Int. Cl.
*H04W 72/044* (2023.01)
*H04J 13/00* (2011.01)
*H04L 5/00* (2006.01)

(52) U.S. Cl.
CPC ..... *H04W 72/0466* (2013.01); *H04J 13/0062* (2013.01); *H04L 5/0048* (2013.01)

(58) Field of Classification Search
CPC . H04B 7/0456; H04B 7/0695; H04L 27/2614; H04L 5/0051; H04L 27/2615;
(Continued)

(56) References Cited

U.S. PATENT DOCUMENTS 11,025,456 B2 *  6/2021  Chatterjee ............. H04L 5/0048
11,343,040 B2 *  5/2022  Noh ....................... H04L 27/186
(Continued)

FOREIGN PATENT DOCUMENTS

CN       110768762 A     2/2020

OTHER PUBLICATIONS

"Remaining issues on low PAPR RS", 3GPP TSG RAN WG1 #100-e, R1-2000768, NEC, Feb. 24-Mar. 6, 2020, pp. 1-4.
(Continued)

*Primary Examiner* — Jung Liu
(74) *Attorney, Agent, or Firm* — Sughrue Mion, PLLC (57) ABSTRACT

Embodiments of the present disclosure relate to methods, devices and computer readable media for communication. A method comprises determining, at a first device, a first parameter for determination of a sequence group index based on at least one of the following: a second parameter indicating an identity associated with a physical channel between the first device and a second device, a third parameter indicating a scrambling identity, and a fourth parameter indicating a cell identity; determining the sequence group index based on the first parameter; generating, at least based on the sequence group index, a Demodulation Reference Signal (DMRS) sequence to be transmitted to the second device; and transmitting the generated DMRS sequence to the second device over the physical channel. Embodiments of the present disclosure can enable DMRS transmission with low Peak to Average Power Ratio (PAPR) and high flexibility.

12 Claims, 4 Drawing Sheets

(58) Field of Classification Search
CPC . H04L 5/0048; H04L 27/186; H04L 27/2613; H04L 27/2692; H04L 27/2646; H04L 27/2636; H04L 27/26132; H04W 72/21; H04W 16/28; H04W 72/046; H04W 72/02; H04W 72/20; H04J 13/004; H04J 13/0014

See application file for complete search history.

(56) References Cited

U.S. PATENT DOCUMENTS

| | | | | |
|---|---|---|---|---|
| 11,558,891 | B2* | 1/2023 | Jeon | H04W 52/50 |
| 11,716,225 | B2* | 8/2023 | Chatterjee | H04W 76/11 |
| | | | | 370/329 |
| 2015/0341942 | A1* | 11/2015 | Lee | H04W 72/23 |
| | | | | 370/252 |
| 2015/0382356 | A1* | 12/2015 | Kim | H04L 5/0094 |
| | | | | 370/335 |
| 2018/0205577 | A1* | 7/2018 | Shin | H04L 5/0048 |
| 2021/0067391 | A1* | 3/2021 | Sengupta | H04L 27/2614 |
| 2021/0250944 | A1* | 8/2021 | Ji | H04L 5/0055 |
| 2021/0314925 | A1* | 10/2021 | Shin | H04L 5/0053 |
| 2022/0210844 | A1* | 6/2022 | MolavianJazi | H04W 74/0866 |
| 2022/0294585 | A1* | 9/2022 | Noh | H04B 7/0456 |
| 2023/0023719 | A1* | 1/2023 | Ji | H04W 16/28 |
| 2023/0362037 | A1* | 11/2023 | Chatterjee | H04L 5/0048 |

OTHER PUBLICATIONS

International Search Report for PCT/CN2020/075863 dated Nov. 23, 2020.
Written Opinion for PCT/CN2020/075863 dated Nov. 23, 2020.

* cited by examiner

METHOD, DEVICE AND COMPUTER STORAGE MEDIUM FOR COMMUNICATION

CROSS REFERENCE TO RELATED APPLICATIONS

This application is a National Stage of International Application No. PCT/CN2020/075863 filed Feb. 19, 2020.

TECHNICAL FIELD

Embodiments of the present disclosure generally relate to the field of telecommunication, and in particular, to methods, devices and computer storage media for communication.

BACKGROUND

In order to support a wide range of services, the 5G New Radio (NR) system aims to be flexible enough to meet the connectivity requirements of a range of existing and future (as yet unknown) services to be deployable in an efficient manner. In particular, NR considers supporting the potential use of frequency ranges up to 100 GHz.

However, frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz.

SUMMARY

In general, example embodiments of the present disclosure provide methods, devices and computer storage media for communication.

In a first aspect, there is provided a method of communication. The method comprises determining, at a first device, a first parameter for determination of a sequence group index based on at least one of the following: a second parameter indicating an identity associated with a physical channel between the first device and a second device, a third parameter indicating a scrambling identity, and a fourth parameter indicating a cell identity; determining the sequence group index based on the first parameter; generating, at least based on the sequence group index, a Demodulation Reference Signal (DMRS) sequence to be transmitted to the second device; and transmitting the generated DMRS sequence to the second device over the physical channel.

In a second aspect, there is provided a method of communication. The method comprises determining, at a second device, a first parameter for determination of a sequence group index based on at least one of the following: a second parameter indicating an identity associated with a physical channel between a first device and the second device, a third parameter indicating a scrambling identity, and a fourth parameter indicating a cell identity; determining the sequence group index based on the first parameter; determining, based on the sequence group index, a Demodulation Reference Signal (DMRS) sequence to be received from the first device; and receiving the determined DMRS sequence from the first device via the physical channel.

In a third aspect, there is provided a method of communication. The method comprises generating, at a first device, different reference signal (RS) sequences to be transmitted to a second device over a plurality of RS ports, the plurality of RS ports being associated with same time resources; and transmitting, to the second device, the different RS sequences over the plurality of RS ports.

In a fourth aspect, there is provided a method of communication. The method comprises determining, at a second device, different reference signal (RS) sequences to be received from a first device over a plurality of RS ports, the plurality of RS ports being associated with same time resources; and receiving, from the first device, the different RS sequences over the plurality of RS ports.

In a fifth aspect, there is provided a first device. The first device comprises a processor and a memory coupled to the processor. The memory stores instructions that when executed by the processor, cause the first device to perform the method according to the above first aspect.

In a sixth aspect, there is provided a second device. The second device comprises a processor and a memory coupled to the processor. The memory stores instructions that when executed by the processor, cause the second device to perform the method according to the above second aspect.

In a seventh aspect, there is provided a first device. The first device comprises a processor and a memory coupled to the processor. The memory stores instructions that when executed by the processor, cause the first device to perform the method according to the above third aspect.

In an eighth aspect, there is provided a second device. The second device comprises a processor and a memory coupled to the processor. The memory stores instructions that when executed by the processor, cause the second device to perform the method according to the above fourth aspect.

In a ninth aspect, there is provided a computer readable medium having instructions stored thereon. The instructions, when executed on at least one processor, cause the at least one processor to perform the method the above first, second, third or fourth aspect.

In a tenth aspect, there is provided a computer program product that is stored on a computer readable medium and includes machine-executable instructions. The machine-executable instructions, when being executed, cause a machine to perform the method according to the above first, second, third or fourth aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Figure 1:
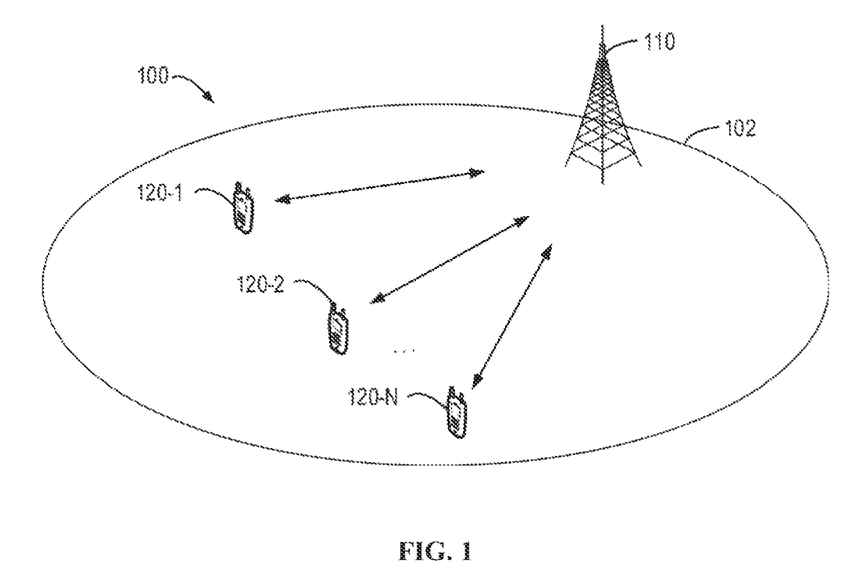
FIG. 1 illustrates an example communication network in which implementations of the present disclosure can be implemented.

FIG. 1 shows an example communication network 100 in which implementations of the present disclosure can be implemented. The communication network 100 includes a network device 110 and terminal devices 120-1, 120-2 . . . and 120-N (where N is a natural number), which can be collectively referred to as "terminal devices" 120 or individually referred to as "terminal device" 120. The network 100 can provide one or more cells 102 to serve the terminal device 120. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: Radio Resource Control (RRC) signaling, Medium Access Control (MAC) control element (CE) or Downlink Control Information (DCI).

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. Examples of the RS may include but are not limited to Demodulation Reference Signal (DMRS), Channel State Information-Reference Signal (CSI-RS), Sounding Reference Signal (SRS), Phase Tracking Reference Signal (PTRS), fine time and frequency Tracking Reference Signal (TRS) and so on.

For example, in the case of DL DMRS transmission, a DMRS may be used by the terminal device 120 for DL channel demodulation. Generally speaking, the DMRS is a signal sequence (also referred to as "DMRS sequence") that is known by both the network device 110 and the terminal device 120. For example, in DL DMRS transmission, a DMRS sequence may be generated and transmitted by the network device 110 based on a certain rule and the terminal device 120 may deduce the DMRS sequence based on the same rule. Similarly, in the case of UL DMRS transmission, the DMRS may be used by the network device 110 for UL channel demodulation. For example, in UL DMRS transmission, a DMRS sequence may be generated and transmitted by the terminal device 120 based on a certain rule and the network device 110 may deduce the DMRS sequence based on the same rule.

In recent 3GPP meetings, it has been proposed to specify CSI-RS and DMRS (both downlink and uplink) enhancement for PAPR reduction for one or more layers (no change on resource element mapping specified in Release 15). However, frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz.

Regarding UL DMRS in NR, in the 3GPP specification TS 38.211 clause 6.4.1.1.1.1, the sequence generation when transform pre-coding is disabled is specified as below. If transform pre-coding for Physical Uplink Shared Channel (PUSCH) is not enabled, the sequence r(n) shall be generated according to:

$$r(n) = \frac{1}{\sqrt{2}}(1 - 2 \cdot c(2n)) + j\frac{1}{\sqrt{2}}(1 - 2 \cdot c(2n+1))$$

where the pseudo-random sequence c(i) is defined in clause 5.2.1 of TS 38.211. The pseudo-random sequence generator shall be initialized with $$c_{init} = \left(2^{17}(N_{symb}^{slot}n_{s,f}^{\mu} + l + 1)(2N_{ID}^{\bar{n}_{SCID}^{\bar{\lambda}}} + 1) + 2^{17}\left\lfloor\frac{\bar{\lambda}}{2}\right\rfloor + 2N_{ID}^{\bar{n}_{SCID}^{\bar{\lambda}}} + \bar{n}_{SCID}^{\bar{\lambda}}\right) \bmod 2^{31}$$

where l is the Orthogonal Frequency Division Multiplexing (OFDM) symbol number within the slot, $n_{s,f}^{\mu}$ is the slot number within a frame, and $N_{ID}^0$, $N_{ID}^1 \in \{0, 1, \ldots, 65535\}$ are given by the higher-layer parameters scramblingID0 and scramblingID1, respectively, in the DAMS-UplinkConfig IE if provided and the PUSCH is scheduled by DCI format 0_1 or 0_2, or by a PUSCH transmission with a configured grant;

$N_{ID}^0 \in \{0, 1, \ldots, 65535\}$ is given by the higher-layer parameter scramblingID0 in the DMRS-UplinkConfig IE if provided and the PUSCH is scheduled by DCI format 0_0 with the CRC (Cyclic Redundancy Check) scrambled by C-RNTI (Cell-Radio Network Temporary Identifier), MCS-C-RNTI (Modulation Coding Scheme-C-RNTI), or CS-RNTI (Configured Scheduling RNTI);

$N_{ID}^0$, $N_{ID}^1 \in \{0, 1, \ldots, 65535\}$ are, for each msgA PUSCH configuration, given by the higher-layer parameters msgA-scrambling/D0 and msgA-scrambling/D1, respectively, in the msgA-DMRS-Configuration IE if provided and the PUSCH transmission is triggered by a Type-2 random access procedure as described in clause 8.1A of TS 38.213;

$N_{ID}^{n_{SCID}} = N_{ID}^{cell}$ or $N_{ID}^{\bar{n}_{SCID}^{\bar{\lambda}}} = N_{ID}^{cell}$ otherwise;

$\bar{n}_{SCID}^{\bar{\lambda}}$ and $\bar{\lambda}$ are given by if the higher-layer parameter DMRSuplink-r16 in the DMRS-UplinkConfig IE is provided $$\bar{n}_{SCID}^{\bar{\lambda}} = \begin{cases} n_{SCID} & \lambda = 0 \text{ or } \lambda = 2 \\ 1 - n_{SCID} & \lambda = 1 \end{cases}$$

$$\bar{\lambda} = \lambda$$

where λ is the CDM group defined in clause 6.4.1.1.3. otherwise $$\bar{n}_{SCID}^{\bar{\lambda}} = n_{SCID}$$

$$\lambda = 0$$

The quantity $n_{SCID} \in \{0,1\}$ is indicated by the DM-RS initialization field, if present, either in the DCI associated with the PUSCH transmission if DCI format 0_1 or 0_2, in TS 38.212 is used or by the higher layer parameter dmrs-SeqInitialization, if present, for a Type 1 PUSCH transmission with a configured grant, otherwise $n_{SCID}=0$.

Regarding UL DMRS in NR, in the 3GPP specification TS 38.211 clause 6.4.1.1.1.2, the sequence generation when transform pre-coding is enabled is specified as below. If transform pre-coding for PUSCH is enabled, the reference-signal sequence r(n) shall be generated according to $$r(n) = r_{u,v}^{(\alpha,\delta)}(n)$$

$$n = 0, 1, \ldots, M_{sc}^{PUSCH}/2^\delta - 1$$

where $r_{u,v}^{(\alpha,\delta)}(n)$ with δ=1 and α=0 depends on the configuration:

if the higher-layer parameter DMRSuplinkTransformPrecoding-r16 is configured, π/2-BPSK modulation is used for PUSCH, and the PUSCH transmission is not a msg3 transmission, $r_{u,v}^{(\alpha,\delta)}(n)$ is given by clause 5.2.3 with $c_{init}$ given by $$c_{init} = (2^{17}(N_{symb}^{slot}n_{s,f}^{\mu} + l + 1)(2N_{ID}^{n_{SCID}} + 1) + 2N_{ID}^{n_{SCID}} + n_{SCID}) \bmod 2^{31}$$

where l is the OFDM symbol number within the slot in case of single-symbol DM-RS or the OFDM symbol number in the slot of the first DM-RS symbol in a symbol pair in case of double-symbol DM-RS; $n_{SCID}$ is given by the DCI according to clause 7.3.1.1.2 in TS38.212 for a transmission scheduled by DCI format 0_1 and by the higher-layer parameter antennaPort for a PUSCH transmission scheduled by a type-1 configured grant; and $N_{ID}^{0}$, $N_{ID}^{1} \in \{0, 1, \ldots, 65535\}$ are given by the higher-layer parameters pi2BPSKscramblingID0 and pi2BPSKscramblingID1, respectively, in the DMRS-UplinkConfig IE if provided and the PUSCH is scheduled by DCI format 0_1 or by a PUSCH transmission with a configured grant;

$N_{ID}^{0} \in \{0, 1, \ldots, 65535\}$ is given by the higher-layer parameter pi2BPSKscramblingID0 in the DMRS-UplinkConfig IE if provided and the PUSCH is scheduled by DCI format 0_0 with the CRC scrambled by C-RNTI, MCS-C-RNTI, or CS-RNTI;

$N_{ID}^{n_{SCID}} = N_{ID}^{cell}$ otherwise;

otherwise, $r_{u,v}^{(\alpha,\delta)}(n)$ is given by clause 5.2.2 of TS 38.211.

The sequence group $u = (f_{gh} + n_{ID}^{RS}) \bmod 30$, where $n_{ID}^{RS}$ is given by $n_{ID}^{RS} = n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR (Random Access Response) UL grant nor scheduled by DCI format 0_0 with CRC scrambled by TC-RNTI according to clause 8.3 in TS 38.213;

$n_{ID}^{RS} = n_{ID}^{PUSCH}$ if $n_{ID}^{PUSCH} = n_{ID}^{n_{SCID}}$, the higher-layer parameter DMRSuplinkTransformPrecoding-r16 is configured, π/2-BPSK modulation is used for PUSCH, and the PUSCH transmission is not a msg3 transmission;

$n_{ID}^{RS} = N_{ID}^{cell}$ otherwise;

where $f_{gh}$ and the sequence number v are given by:

if neither group, nor sequence hopping is enabled $f_{gh} = 0$ $v = 0$ if group hopping is enabled and sequence hopping is disabled $f_{gh} = (\Sigma_{m=0}^{7} 2^m c(8(n_{symb}^{slot} n_{s,f}^\mu + l) + m)) \bmod 30$ $v = 0$ where the pseudo-random sequence c(i) is defined by clause 5.2.1 of TS 38.211 and shall be initialized with $c_{init} = \lfloor n_{ID}^{RS}/30 \rfloor$ at the beginning of each radio frame;

if sequence hopping is enabled and group hopping is disabled $f_{gh} = 0$ $v = \begin{cases} c(N_{symb}^{slot} n_{s,f}^\mu + l) & \text{if } M_{ZC} \geq 6 N_{sc}^{RB} \\ 0 & \text{otherwise} \end{cases}$ where the pseudo-random sequence c(i) is defined by clause 5.2.1 and shall be initialized with $c_{init} = n_{ID}^{RS}$ at the beginning of each radio frame.

Regarding DL DMRS in NR, in the 3GPP specification TS 38.211 clause 7.4.1.1.1, the sequence generation is specified as below. The UE shall assume the sequence r(n) is defined by $$r(n) = \frac{1}{\sqrt{2}}(1 - 2 \cdot c(2n)) + j\frac{1}{\sqrt{2}}(1 - 2 \cdot c(2n+1)).$$

where the pseudo-random sequence c(i) is defined in clause 5.2.1 of TS 38.211. The pseudo-random sequence generator shall be initialized with $$c_{init} = \left(2^{17}(N_{symb}^{slot} n_{s,f}^\mu + l + 1)(2N_{ID}^{\bar{n}_{SCID}^{\bar{\lambda}}} + 1) + 2^{17}\left\lfloor\frac{\bar{\lambda}}{2}\right\rfloor + 2N_{ID}^{\bar{n}_{SCID}^{\bar{\lambda}}} + \bar{n}_{SCID}^{\bar{\lambda}}\right) \bmod 2^{31}$$

where l is the OFDM symbol number within the slot, $n_{s,f}^\mu$ is the slot number within a frame, and $N_{ID}^{0}$, $N_{ID}^{1} \in \{0, 1, \ldots, 65535\}$ are given by the higher-layer parameters scramblingID0 and scramblingID1, respectively, in the DMRS-DownlinkConfig IE if provided and the PDSCH (Physical Downlink Shared Channel) is scheduled by PDCCH using DC format 1_1 or 1_2 with the CRC scrambled by C-RNTI, MCS-C-RNTI, or CS-RNTI;

$N_{ID}^{0} \in \{0, 1, \ldots, 65535\}$ is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI;

$N_{ID}^{n_{SCID}} = N_{ID}^{cell}$ or $N_{ID}^{\bar{n}_{SCID}^{\bar{\lambda}}} = N_{ID}^{cell}$ otherwise;

$\bar{n}_{SCID}^{\bar{\lambda}}$ and $\bar{\lambda}$ are given by if the higher-layer parameter DMRSdownlink-r16 in the DMRS-DownlinkConfig IE is provided $\bar{n}_{SCID}^{\bar{\lambda}} = \begin{cases} n_{SCID} & \lambda = 0 \text{ or } \lambda = 2 \\ 1 - n_{SCID} & \lambda = 1 \end{cases}$ $\bar{\lambda} = \lambda$ where λ is the CDM group defined in clause 7.4.1.1.2. otherwise $\bar{n}_{SCID}^{\bar{\lambda}} = n_{SCID}$ $\bar{\lambda} = 0$ The quantity $n_{SCID} \in \{0, 1\}$ is given by the DM-RS sequence initialization field, if present, in the DCI associated with the PDSCH transmission if DCI format 1_1 or 1_2 in TS 38.212 is used, otherwise $n_{SCID} = 0$.

In view of the above specifications, it can be seen that if the higher-layer parameter DMRSuplinkTransformPrecoding-r16 is configured, to generate an uplink DMRS sequence with a length less than 30, only if $n_{IS}^{PUSCH} = N_{ID}^{n_{SCID}}$, then $n_{ID}^{RS} = n_{ID}^{PUSCH}$; otherwise $n_{ID}^{RS} = N_{ID}^{cell}$. However, in current specifications, the value range of $n_{ID}^{PUSCH}$ is {0, 1, . . . , 1007}, which is quite different from the value range of $N_{ID}^{n_{SCID}}$ (that is, {0, 1, . . . , 65535}). This is because $N_{ID}^{n_{SCID}}$ is mainly used for generation of a PN sequence which a length equal to or greater than 30. As such, in most cases, the condition for $n_{ID}^{PUSCH} = N_{ID}^{n_{SCID}}$ cannot be satisfied. That is, in most cases, $n_{ID}^{RS} = N_{ID}^{cell}$ (i.e. for most UEs, the same cell identity will be used), which will reduce the flexibility and ability for interference management.

Further, if more than one DMRS ports are supported for one UE for uplink transmission based on Discrete Fourier Transform-Spread-Orthogonal Frequency Division Multiplexing (DFT-s-OFDM), or if low PAPR DMRS sequences (e.g. DFT-s-OFDM) are introduced for downlink transmission, according to the current structure (i.e. comb structure), a same DMRS sequence will be used for different comb offsets, which will cause higher PAPR. Furthermore, for downlink transmission, even only one port per UE, according to the current specifications, UEs will use only the cell identity for sequence generation, which will also cause the high PAPR issue.

Example embodiments of the present disclosure provide a solution to solve the above problems and/or one or more of other potential problems. Embodiments of the present disclosure can enable DMRS transmission with low PAPR and high flexibility.

Figure 2:
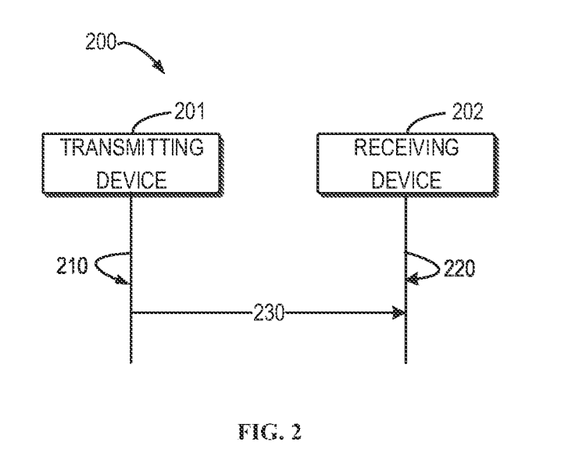
FIG. 2 illustrates a signaling chart of an example process for RS transmission in accordance with some embodiments of the present disclosure.

FIG. 2 illustrates a signaling chart of an example process 200 for RS transmission in accordance with some embodiments of the present disclosure. In the example process 200, a transmitting device 201 and a receiving device 202 are involved. For example, for UL RS transmission, the transmitting device 201 can be implemented as the terminal device 120 as shown in FIG. 1, while the receiving device 202 can be implemented as the network device 110 as shown in FIG. 1. For DL RS transmission, the transmitting device 201 can be implemented as the network device 110 as shown in FIG. 1, while the receiving device 202 can be implemented as the terminal device 120 as shown in FIG. 1.

As shown in FIG. 2, the transmitting device 201 generates (210) one or more RS sequences to be transmitted to the receiving device 202 based on a certain rule and transmits (230) the generated one or more RS sequences to the receiving device 202. On the other side, the receiving device 202 determines (220) the one or more RS sequences transmitted from the transmitting device 201 based on the same rule and receives (230) the determined one or more RS sequences from the transmitting device 201. Examples of the RS sequence may include, but not limited to, a DMRS sequence, a SRS sequence, a PTRS sequence, a TRS sequence or a CSI-RS sequence. In the following, the transmitting device 201 is also referred to as "first device 201" and the receiving device 202 is also referred to as "second device 202".

Figure 3:
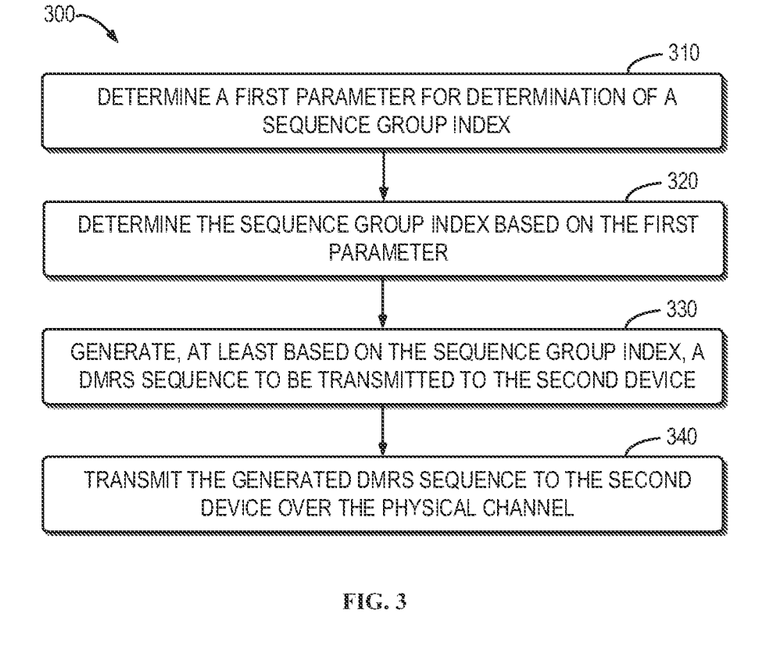
FIG. 3 illustrates a flowchart of an example method in accordance with some embodiments of the present disclosure.

FIG. 3 illustrates a flowchart of an example method 300 for DMRS transmission according to some embodiments of the present disclosure. The method 300 can be implemented at the first device 201 as shown in FIG. 2. It is to be understood that the method 300 may include additional blocks not shown and/or may omit some blocks as shown, and the scope of the present disclosure is not limited in this regard.

At block 310, the first device 201 determines a first parameter for determination of a sequence group index based on at least one of the following: a second parameter indicating an identity associated with a physical channel between the first device 201 and the second device 202, a third parameter indicating a scrambling identity, and a fourth parameter indicating a cell identity (ID). For example, the first parameter may correspond to $n_{ID}^{RS}$. The second parameter may correspond to $n_{ID}^{PUSCH}$ which is configured by the higher-layer parameter nPUSCH-Identity in the DMRS-UplinkConfig IE. The third parameter may correspond to $N_{ID}^{nSCID}$ (for example, $N_{ID}^{0}$ and/or $N_{ID}^{1}$ given by the higher-layer parameters pi2BPSKscramblingID0 and/or pi2BPSKscramblingID1) and the fourth parameter may correspond to $N_{ID}^{cell}$, as specified in the 3GPP specifications. In some embodiments, $N_{ID}^{nSCID}$ is a scrambling ID and $n_{SCID}$ is an index for the scrambling ID, where $N_{ID}^{nSCID}$ is an integer, $N_{ID}^{nSCID} \in \{0, 1, \ldots, 65535\}$ and $n_{SCID} \in \{0, 1\}$.

In some embodiments, to generate an UL DMRS sequence, the first parameter $n_{ID}^{RS}$ can be determined based on at least one of the second parameter $n_{ID}^{PUSCH}$, the third parameter $N_{ID}^{nSCID}$ (for example, $N_{ID}^{0}$ and/or $N_{ID}^{1}$) and the fourth parameter $N_{ID}^{cell}$.

In some embodiments, if the second parameter $n_{ID}^{PUSCH}$ is configured to the first device 201, the first device 201 may determine the first parameter $n_{ID}^{RS}$ based on the second parameter $n_{ID}^{PUSCH}$. For example, $n_{ID}^{RS}=n_{ID}^{PUSCH}$. Otherwise, the first device 201 may determine the first parameter $n_{ID}^{RS}$ based on the fourth parameter $N_{ID}^{cell}$. For example, $n_{ID}^{RS}=N_{ID}^{cell}$.

Alternatively, in some embodiments, if the third parameter $N_{ID}^{nSCID}$ (for example, $N_{ID}^{0}$ and/or $N_{ID}^{1}$) is configured to the first device 201, the first device 201 may determine the first parameter $n_{ID}^{RS}$ based on the third parameter $N_{ID}^{nSCID}$. For example, $n_{ID}^{RS}=N_{ID}^{nSCID}$. For another example, $n_{ID}^{RS}=N_{ID}^{nSCID} \mod M$, where M is an integer and $30 \leq M \leq 1024$. For example, M=1008. Otherwise, the first device 201 may determine the first parameter $n_{ID}^{RS}$ based on the fourth parameter $N_{ID}^{cell}$. For example, $n_{ID}^{RS}=N_{ID}^{cell}$.

Alternatively, in some embodiments, if the second parameter $n_{ID}^{PUSCH}$ and the third parameter $N_{ID}^{nSCID}$ (for example, $N_{ID}^{0}$ and/or $N_{ID}^{1}$) are configured to the first device 201, the first device 201 may determine the first parameter $n_{ID}^{RS}$ based on the second parameter $n_{ID}^{PUSCH}$ or the third parameter $N_{ID}^{nSCID}$. For example, $n_{ID}^{RS}=n_{ID}^{PUSCH}$, or $n_{ID}^{RS}=N_{ID}^{nSCID}$, or $n_{ID}^{RS}=N_{ID}^{nSCID} \mod M$, where M is an integer and $30 \leq M \leq 1024$. For example, M=1008. Otherwise, the first device 201 may determine the first parameter $n_{ID}^{RS}$ based on the fourth parameter $N_{ID}^{cell}$. For example, $n_{ID}^{RS}=N_{ID}^{cell}$.

Alternatively, in some embodiments, if the second parameter $n_{ID}^{PUSCH}$ and the third parameter $N_{ID}^{nSCID}$ (for example, $N_{ID}^{0}$ and/or $N_{ID}^{1}$) are configured to the first device 201, the first device 201 may adjust the third parameter $N_{ID}^{nSCID}$ so that the adjusted third parameter has a same value range as the first parameter $n_{ID}^{RS}$. For example, the first device 201 may apply a modulo operation to the third parameter $N_{ID}^{nSCID}$, such as $N_{ID}^{nSCID} \mod M$, where M is an integer and $30 \leq M \leq 1024$, for example, M=1008. As such, the result of the modulo operation can have a same value range as the first parameter $n_{ID}^{RS}$, such as $\{0, 1, \ldots, 1007\}$. The first device 201 may further determine the first parameter $n_{ID}^{RS}$ based on whether the adjusted third parameter (for example, $N_{ID}^{nSCID} \mod M$) is equal to the second parameter $n_{ID}^{PUSCH}$. For example, if $n_{ID}^{PUSCH}=N_{ID}^{nSCID} \mod M$, $n_{ID}^{RS}=n_{ID}^{PUSCH}$; otherwise, $n_{ID}^{RS}=n_{ID}^{cell}$.

At block 320, the first device 201 determines the sequence group index based on the first parameter.

In some embodiments, the sequence group index u may be determined as $u=(f_{gh}+n_{ID}^{RS}) \mod 30$, where $n_{ID}^{RS}$ is given by: $n_{ID}^{RS}=n_{ID}^{PUSCH}$ if $n_{ID}^{PUSCH}$ is configured by the higher-layer parameter nPUSCH-Identify in the DMRS-UplinkConfig IE and the PUSCH is neither scheduled by RAR (Random Access Response) UL (uplink) grant nor scheduled by DCI format 0_0 with CRC (Cyclic Redundancy Check) scrambled by TC-RNTI (Temporary Cell-Radio Network Temporary Identifier) according to clause 8.3 in TS 38.213; $n_{ID}^{RS}=n_{ID}^{PUSCH}$ (or $n_{ID}^{RS}=N_{ID}^{nSCID}$, or $n_{ID}^{RS}=N_{ID}^{nSCID} \mod M$) if the higher-layer parameter DMRSuplinkTransformPrecoding-r16 is configured, π/2-BPSK modulation is used for PUSCH, and the PUSCH transmission is not a msg3 transmission; $n_{ID}^{RS}=N_{ID}^{cell}$ otherwise.

In some embodiments, the parameter $f_{gh}$ related to group hopping can be determined as legacy solutions: if neither group, nor sequence hopping is enabled, $f_{gh}=0$; if group hopping is enabled and sequence hopping is disabled, $f_{gh}=(\sum_{m=0}^{7} 2^m c(8(N_{symb}^{slot} n_{s,f}^{\mu}+1)+m)) \bmod 30$, where the pseudo-random sequence c(i) is defined by clause 5.2.1 in TS 38.211 and shall be initialized with $c_{init}=\lfloor n_{ID}^{RS}/30 \rfloor$ at the beginning of each radio frame, $N_{symb}^{slot}$ is the number of symbols per slot, $n_{s,f}^{\mu}$ is the slot number/index within a frame for subcarrier spacing configuration µ (as defined in clause 4.3.2 in TS 38.211); if sequence hopping is enabled and group hopping is disabled, $f_{gh}=0$.

In some embodiments, if $n_{ID}^{PUSCH}$ is configured by the higher-layer parameter nPUSCH-Identity in the DMRS-UplinkConfig IE, and/or if the PUSCH is neither scheduled by RAR UL grant nor scheduled by DCI format 0_0 with CRC scrambled by TC-RNTI according to clause 8.3 in TS 38.213, and/or if the higher-layer parameter DMRSuplinkTransformPrecoding-r16 is not configured, the sequence group u may be determined as $u=(f_{gh}+n_{ID}^{RS}) \bmod 30$, where $n_{ID}^{RS}$ is given by: $n_{ID}^{RS}=n_{ID}^{PUSCH}$.

In some embodiments, if the higher-layer parameter DMRSuplinkTransformPrecoding-r16 is configured, and/or if π/2-BPSK modulation is used for PUSCH, and/or if the PUSCH transmission is not a msg3 transmission, and/or if $n_{ID}^{PUSCH}$ is configured by the higher-layer parameter nPUSCH-Identity in the DMRS-UplinkConfig IE, and/or if $N_{ID}^{nSCID}$ is given by the higher-layer parameter pi2BPSKscramblingID0 and/or pi2BPSKscramblingID1 in the DMRS-UplinkConfig IE, and/or if $N_{ID}^{0}$ and $N_{ID}^{1}$ are given by the higher-layer parameter pi2BPSKscramblingID0 and pi2BPSKscramblingID1, respectively, in the DMRS-UplinkConfig IE, and/or if $N_{ID}^{0}$ is given by the higher-layer parameter pi2BPSKscramblingID0 in the DMRS-UplinkConfig IE, and/or if $n_{ID}^{PUSCH}=N_{ID}^{nSCID}$, the sequence group u may be determined as $u=(f_{gh}+N_{ID}^{RS}) \bmod 30$, where $N_{ID}^{RS}$ is given by: $n_{ID}^{RS}=n_{ID}^{PUSCH}$ or $N_{ID}^{RS}=N_{ID}^{nSCID}$, or $n_{ID}^{RS}=N_{ID}^{nSCID} \bmod M$, where M is an integer and 30≤M≤1024, for example, M=1008.

In some embodiments, the sequence group index u may be determined as $u=(f_{gh}+n_{ID}^{RS}) \bmod 30$, where $n_{ID}^{RS}$ is given by: $n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DCI format 0_0 with CRC scrambled by TC-RNTI according to clause 8.3 in TS 38.213 and if the higher-layer parameter DMRSuplinkTransformPrecoding-r16 is not configured; $n_{ID}^{RS}=n_{ID}^{PUSCH}$ (or $n_{ID}^{RS}=N_{ID}^{nSCID}$, or $n_{ID}^{RS}=N_{ID}^{nSCID} \bmod M$) if $n_{ID}^{PUSCH}=N_{ID}^{nSCID}$, the higher-layer parameter DMRSuplinkTransformPrecoding-r16 is configured, π/2-BPSK modulation is used for PUSCH, and the PUSCH transmission is not a msg3 transmission; $n_{ID}^{RS}=N_{ID}^{cell}$ otherwise.

In some embodiments, the sequence group index u may be determined as $u=(f_{gh}+n_{ID}^{RS}) \bmod 30$, where $n_{ID}^{RS}$ is given by: $n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DC format 0_0 with CRC scrambled by TC-RNTI according to clause 8.3 in TS 38.213 and if the higher-layer parameter DMRSuplinkTransformPrecoding-r16 is not configured; $n_{ID}^{RS}=n_{ID}^{PUSCH}$ (or $n_{ID}^{RS}=N_{ID}^{nSCID}$, or $n_{ID}^{RS}=N_{ID}^{nSCID} \bmod M$) if the higher-layer parameter DMRSuplinkTransformPrecoding-r16 is configured, π/2-BPSK modulation is used for PUSCH, and the PUSCH transmission is not a msg3 transmission, and if $n_{ID}^{PUSCH}$ is configured by the higher-layer parameter nPUSCH-Identity in the DMRS-UplinkConfig IE with $n_{ID}^{PUSCH}=N_{ID}^{nSCID}$; $n_{ID}^{RS}=N_{ID}^{cell}$ otherwise.

In some embodiments, the sequence group index u may be determined as $u=(f_{gh}+n_{ID}^{RS}) \bmod 30$, where $n_{ID}^{RS}$ is given by: $n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DCI format 0_0 with CRC scrambled by TC-RNTI according to clause 8.3 in TS 38.213; $n_{ID}^{RS}=n_{ID}^{PUSCH}$ (or $n_{ID}^{RS}=N_{ID}^{nSCID}$, or $n_{ID}^{RS}=N_{ID}^{nSCID} \bmod M$) if the higher-layer parameter DMRSuplinkTransformPrecoding-r16 is configured, π/2-BPSK modulation is used for PUSCH, and the PUSCH transmission is not a msg3 transmission, and if $n_{ID}^{PUSCH}$ is configured by the higher-layer parameter nPUSCH-Identity in the DMRS-UplinkConfig IE with $n_{ID}^{PUSCH}=N_{ID}^{nSCID}$; $n_{ID}^{RS}=n_{ID}^{cell}$ otherwise.

In some embodiments, the sequence group index u may be determined as $u=(f_{gh}+n_{ID}^{RS}) \bmod 30$, where $n_{ID}^{RS}$ is given by: $n_{ID}^{RS}=n_{ID}^{PUSCH}$ if $n_{ID}^{PUSCH}$ is configured by the higher-layer parameter nPUSCH-Identity in the DMRS-UplinkConfig IE and the PUSCH is neither scheduled by RAR UL grant nor scheduled by DCI format 0_0 with CRC scrambled by TC-RNTI according to clause 8.3 in TS 38.213 and if the higher-layer parameter DMRSuplinkTransformPrecoding-r16 is not configured; $n_{ID}^{RS}=n_{ID}^{PUSCH}$ (or $n_{ID}^{RS}=N_{ID}^{nSCID}$, or $n_{ID}^{RS}=N_{ID}^{nSCID} \bmod M$) if the higher-layer parameter DMRSuplinkTransformPrecoding-r16 is configured, π/2-BPSK modulation is used for PUSCH, and the PUSCH transmission is not a msg3 transmission; $n_{ID}^{RS}=n_{ID}^{cell}$ otherwise.

In some embodiments, the scrambling ID $N_{ID}^{nSCID}$ (for example, $N_{ID}^{0}$ and/or $N_{ID}^{1}$) may be given by the higher-layer parameter pi2BPSKscramblingID0 and/or pi2BPSKscramblingID1 in the DMRS-UplinkConfig IE. In some embodiments, the value of pi2BPSKscramblingID0 or pi2BPSKscramblingID1 may be a non-negative integer and within the range of {0, 1, . . . , 65535}. In some embodiments, the value of pi2BPSKscramblingID0 or pi2BPSKscramblingID1 may be a non-negative integer and within the range of {0, 1, . . . , 1007}.

At block 330, the first device 201 generates, at least based on the sequence group index (that is, u), a DMRS sequence to be transmitted to the second device 202. In some embodiments, the DMRS sequence may be one of a Zadoff-Chu (ZC) sequence and a computer generated sequence (CGS). The generation of the DMRS sequence can be implemented as legacy solutions.

At block 340, the first device 201 transmits the generated DMRS sequence to the second device 202 over the physical channel.

In some embodiments, for example, the first device 201 may be a terminal device (for example, the terminal device 120), the second device may be a network device (for example, the network device 110), and the physical channel may be PUSCH.

In view of the above, embodiments of the present disclosure can enable DMRS transmission with low PAPR and high flexibility.

Figure 4:
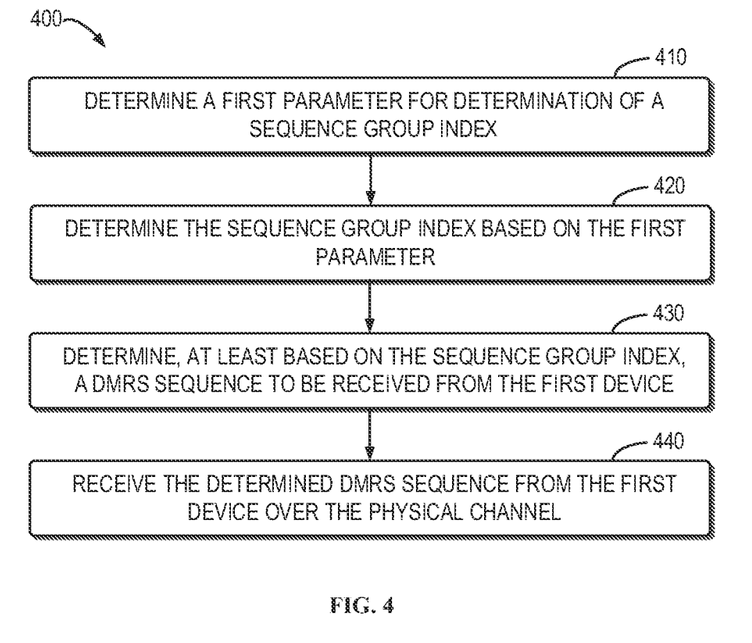
FIG. 4 illustrates a flowchart of an example method in accordance with some embodiments of the present disclosure.

FIG. 4 illustrates a flowchart of an example method 400 for DMRS transmission according to some embodiments of the present disclosure. The method 400 can be implemented at the second device 202 as shown in FIG. 2. It is to be understood that the method 400 may include additional blocks not shown and/or may omit some blocks as shown, and the scope of the present disclosure is not limited in this regard.

At block 410, the second device 202 determines a first parameter for determination of a sequence group index based on at least one of the following: a second parameter indicating an identity associated with a physical channel between a first device and the second device, a third parameter indicating a scrambling identity, and a fourth parameter indicating a cell identity. It is to be understood that the second device 202 can determine the first parameter in the same way as the first device 201.

In some embodiments, in accordance with a determination that the second parameter is configured to the first device 201, the second device 202 may determine the first parameter based on the second parameter. Alternatively, or in addition, in accordance with a determination that the second parameter is not configured to the first device 201, the second device 202 may determine the first parameter based on the fourth parameter.

In some embodiments, in accordance with a determination that the third parameter is configured to the first device 201, the second device 202 may determine the first parameter based on the third parameter. Alternatively, or in addition, in accordance with a determination that the third parameter is not configured to the first device 201, the second device 202 may determine the first parameter based on the fourth parameter.

In some embodiments, in accordance with a determination that the second and third parameters are configured to the first device 201, the second device 202 may determine the first parameter based on the second or third parameter. Alternatively, or in addition, in accordance with a determination that none of the second and third parameters is configured to the first device 201, the second device 202 may determine the first parameter based on the fourth parameter.

In some embodiments, in accordance with a determination that the second and third parameters are configured to the first device 201, the second device 202 may adjust the third parameter so that the adjusted third parameter has a same value range as the first parameter. In accordance with a determination that the adjusted third parameter is equal to the second parameter, the second device 202 may determine the first parameter based on the second parameter.

At block 420, the second device 202 determines the sequence group index based on the first parameter. It is to be understood that the second device 202 can determine the sequence group index in the same way as the first device 201.

At block 430, the second device 202 determines, based on the sequence group index, a DMRS sequence to be received from the first device 201. In some embodiments, the DMRS sequence may comprise any of the following: a ZC sequence; and a CGS.

At block 440, the second device 202 receives the determined DMRS sequence from the first device via the physical channel.

In some embodiments, for example, the first device 201 may be a terminal device (for example, the terminal device 120 as shown in FIG. 1), the second device may be a network device (for example, the network device 110 as shown in FIG. 1), and the physical channel may be PUSCH.

As described above, if more than one DMRS ports are supported for one UE for uplink transmission based on DFT-s-OFDM, or if low PAPR DMRS sequences (e.g. DFT-s-OFDM) are introduced for downlink transmission, according to the current structure (i.e. comb structure), a same DMRS sequence will be used for different comb offsets, which will cause higher PAPR. Furthermore, for downlink transmission, even only one port per UE, according to the current specifications, UEs will use only the cell identity for sequence generation, which will also cause the high PAPR issue.

Figure 5:
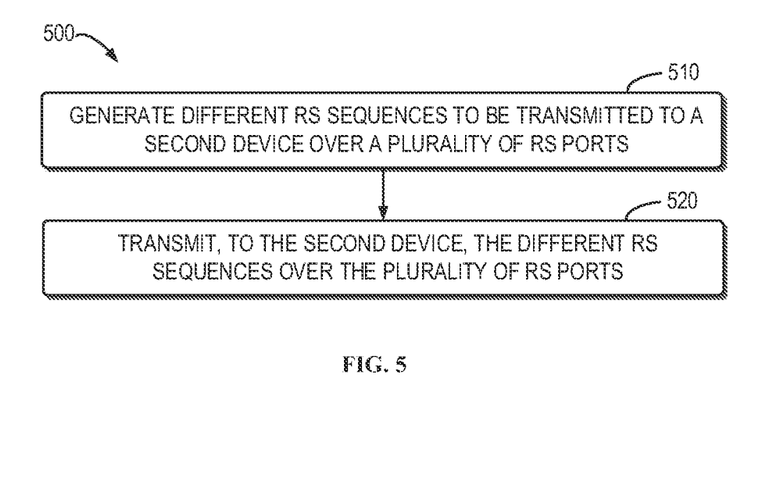
FIG. 5 illustrates a flowchart of an example method in accordance with some embodiments of the present disclosure.

Embodiments of the present disclosure propose a solution to solve the above problem and/or one or more potential problems. FIG. 5 illustrates a flowchart of an example method 500 for RS transmission according to some embodiments of the present disclosure. The method 500 can be implemented at the first device 201 as shown in FIG. 2. It is to be understood that the method 500 may include additional blocks not shown and/or may omit some blocks as shown, and the scope of the present disclosure is not limited in this regard.

At block 510, the first device 201 generates different RS sequences to be transmitted to a second device over a plurality of RS ports.

As used herein, a RS port may refer to a specific mapping of part or all of a RS sequence to one or more resource elements of a resource region allocated for RS transmission in time, frequency, and/or code domains. In some embodiments, the plurality of RS ports are associated with same time resources (for example, same OFDM symbols) but different frequency resources and/or different comb offsets.

In some embodiments, one of the different RS sequences may comprise any of the following: a DMRS sequence, a SRS sequence, a PTRS sequence, a TRS sequence and a CSI-RS sequence. For the purpose of discussion without suggesting any limitation as to the scope of the present disclosure, in the following, some embodiments will be described with reference to DMRS sequences as examples of the plurality of RS sequence.

In some embodiments, if transform pre-coding is enabled, and/or the higher-layer parameter DMRSuplinkTransform-Precoding-r16 is not configured, the first device 201 may generate different ZC sequences or different CGSs as different DMRS sequences to be transmitted over the plurality of RS ports. For example, the plurality of RS ports may be associated with same time resources (for example, same OFDM symbols) but different frequency resources and/or different comb offsets. In some embodiments, the first device 201 may generate different ZC sequences or different CGSs based on different sequence group indices (that is, different values of u) and/or different sequence numbers (that is, different values of v).

In some embodiments, if transform pre-coding for PUSCH and/or PDSCH is enabled, the reference-signal sequence r(n) shall be generated according to $r(n)=r_{u,v}^{(\alpha)}(n)$, where $n=0, 1, \ldots L/C-1$, $r_{u,v}^{(\alpha)}(n)=e^{j\alpha n}\bar{r}_{u,v}(n)$, $\alpha=0$ and $L/C$ is the length of the sequence. $L=R*N_{sc}^{RB}$, where R is the bandwidth of the PUSCH and/or PDSCH in terms of resource blocks or R is the number of resource blocks scheduled/configured for the PUSCH and/or PDSCH, and $N_{sc}^{RB}$ is the number of subcarriers and/or REs (resource elements) in one resource block, for example, $N_{sc}^{RB}=12$. C is the comb value for the reference signal, where C is an integer and $1 \leq C \leq 12$. For example, C may be at least one of {2, 3, 4, 6, 8, 12}. For example, the sequence for reference signal is mapped every C−1 REs or subcarriers in frequency domain.

In some embodiments, the sequence group index $u=(f_{gh}+n_{ID}^{RS}+\Delta) \mod 30$ or $u=(f_{gh}+n_{ID}^{RS}) \mod 30+\Delta$, where $\Delta$ is an integer, and $\Delta=0, 1, \ldots C-1$, In some embodiments, the sequence group index $u=(f_{gh}+\overline{n_{ID}^{RS}}) \mod 30$, and $\overline{n_{ID}^{RS}}=n_{ID}^{RS}+\Delta$, where $\Delta$ is an integer, and $\Delta=0, 1, \ldots C-1$.

In some embodiments, the sequence group index u=($\overline{f_{gh}}+n_{ID}^{RS}$) mod 30, and $\overline{f_{gh}}=f_{gh}+\Delta$, where $\Delta$ is an integer, and $\Delta=0, 1, \ldots$ C−1.

In some embodiments, if transform pre-coding for PUSCH and/or PDSCH is enabled, the reference-signal sequence r(n) shall be generated according to r(n)=$r_{u,\overline{v}}^{(\alpha)}$(n), where n=0, 1, $\ldots$ L/C−1, $r_{u,v}^{(\alpha)}$(n)=$e^{j\alpha n}\overline{r}_{u,v}$(n), $\alpha$=0 and L/C is the length of the sequence. L=R*$N_{sc}^{RB}$, where R is the bandwidth of the PUSCH and/or PDSCH in terms of resource blocks or R is the number of resource blocks scheduled/configured for the PUSCH and/or PDSCH, and $N_{sc}^{RB}$ is the number of subcarriers and/or REs (resource elements) in one resource block, for example, $N_{sc}^{RB}$=12. C is the comb value for the reference signal, where C is an integer, and 1≤C≤12. For example, C may be at least one of {2, 3, 4, 6, 8, 12}. For example, the sequence for reference signal is mapped every C−1 REs or subcarriers in frequency domain. In some embodiments, the sequence number/index $\overline{v}$=v+$\Delta$, where $\Delta$ is an integer, and $\Delta$=0, 1, $\ldots$ C−1.

In some embodiments, the parameter $f_{gh}$ related to group hopping can be determined according to legacy solutions. In some embodiments, $n_{ID}^{RS}$ is the identity for calculation of sequence group value, the value of $n_{ID}^{RS}$ may be configured by higher-layer or the cell identity (for example, $N_{ID}^{cell}$) by default.

In some embodiments, if transform pre-coding is enabled, and/or the higher-layer parameter DMRSuplinkTransform-Precoding-r16 is configured, the first device 201 may generate different pseudo-random sequences or different CGSs as different DMRS sequences to be transmitted over the plurality of RS ports. For example, the plurality of RS ports may be associated with same time resources (for example, same OFDM symbols) but different frequency resources and/or different comb offsets.

In some embodiments, if the sequence length exceeds X (where X is an integer and 24<X<3600), for example, X is any of {24, 30, 36}, the first device 201 may generate different pseudo-random sequences by initializing a pseudo-random sequence generator with different values.

In some embodiments, the sequence generation is specified as below, the sequence r(n) shall be generated according to:

$$r(n) = \frac{1}{\sqrt{2}}(1-2\cdot c(2n)) + j\frac{1}{\sqrt{2}}(1-2\cdot c(2n+1))$$

where the pseudo-random sequence c(i) is defined in clause 5.2.1 of TS 38.211. The pseudo-random sequence generator shall be initialized with $c_{init}=(2^{17}(N_{symb}^{slot}n_{s,f}^{\mu}+l+1)(2N_{ID}^{\overline{n}_{SCID}^{\overline{\lambda}}}+1)+2N_{ID}^{\overline{n}_{SCID}^{\overline{\lambda}}}+\overline{n}_{SCID}^{\overline{\lambda}})$ mod $2^{31}$ where l is the OFDM symbol number within the slot, $n_{s,f}^{\mu}$ is the slot number within a frame, and $N_{ID}^{0}, N_{ID}^{1} \in \{0, 1, \ldots, 65535\}$ are given by higher-layer parameter if provided;

$N_{ID}^{0} \in \{0, 1, \ldots, 65535\}$ is given by higher-layer parameter if provided;

$N_{ID}^{n_{SCID}}=N_{ID}^{cell}$ or $N_{ID}^{\overline{n}_{SCID}^{\overline{\lambda}}}=N_{ID}^{cell}$ otherwise;

$n_{SCID}^{\overline{\lambda}}$ and $\overline{\lambda}$ are given by $$\overline{n}_{SCID}^{\overline{\lambda}} = \begin{cases} n_{SCID} & \lambda = 0 \\ 1 - n_{SCID} & \lambda = 1 \end{cases}$$

$$\overline{\lambda} = \lambda$$

The quantity $n_{SCID} \in \{0,1\}$ is indicated by the DM-RS initialization field, if present, either in the DCI associated with the PUSCH/PDSCH transmission, otherwise $n_{SCID}$=0.

In some embodiments, if the sequence length is equal to or below X (where X is an integer and 24<X<3600), for example, X is any of {24, 30, 36}, the first device 201 may generate different CGSs based on different sequence group indices (that is, different values of u) and/or different sequence numbers (that is, different values of v).

In some embodiments, the reference-signal sequence r(n) shall be generated according to r(n)=$r_{u,v}^{(\alpha)}$(n), where n=0, 1, $\ldots$ L/C−1, $r_{u,v}^{(\alpha)}$(n)=$e^{j\alpha n}\overline{r}_{u,v}$(n), $\alpha$=0 and L/C is the length of the sequence. L=R*$N_{sc}^{RB}$, where R is the bandwidth of the PUSCH and/or PDSCH in terms of resource blocks or R is the number of resource blocks scheduled/configured for the PUSCH and/or PDSCH, and $N_{sc}^{RB}$ is the number of subcarriers and/or REs (resource elements) in one resource block, for example, $N_{sc}^{RB}$=12. C is the comb value for the reference signal, where C is an integer and 1≤C≤12. For example, C may be at least one of {2, 3, 4, 6, 8, 12}. For example, the sequence for reference signal is mapped every C−1 REs or subcarriers in frequency domain.

In some embodiments, the sequence group index u=($f_{gh}$+$n_{ID}^{RS}$+$\Delta$) mod 30 or u=($f_{gh}$+$n_{ID}^{RS}$) mod 30+$\Delta$, where $\Delta$ is an integer and $\Delta$=0, 1, $\ldots$ C−1, In some embodiments, the sequence group index u=($f_{gh}$+$\overline{n_{ID}^{RB}}$) mod 30, and $\overline{n_{ID}^{RS}}=n_{ID}^{RS}+\Delta$, where $\Delta$ is an integer and $\Delta$=0, 1, $\ldots$ C−1.

In some embodiments, the sequence group index u=($\overline{f_{gh}}+n_{ID}^{RS}$) mod 30, and $\overline{f_{gh}}=f_{gh}+\Delta$, where $\Delta$ is an integer and $\Delta$=0, 1, $\ldots$ C−1.

In some embodiments, if transform pre-coding for PUSCH and/or PDSCH is enabled, the reference-signal sequence r(n) shall be generated according to r(n)=$r_{u,\overline{v}}^{(\alpha)}$(n), where n=0, 1, $\ldots$ L/C−1, $r_{u,v}^{(\alpha)}$(n)=$e^{j\alpha n}\overline{r}_{u,v}$(n), $\alpha$=0 and L/C is the length of the sequence. L=R*$N_{sc}^{RB}$, where R is the bandwidth of the PUSCH and/or PDSCH in terms of resource blocks or R is the number of resource blocks scheduled/configured for the PUSCH and/or PDSCH, and $N_{sc}^{RB}$ is the number of subcarriers and/or REs (resource elements) in one resource block, for example, $N_{sc}^{RB}$=12. C is the comb value for the reference signal, where C is an integer, and 1≤C≤12. For example, C may be at least one of {2, 3, 4, 6, 8, 12}. For example, the sequence for reference signal is mapped every C−1 REs or subcarriers in frequency domain. In some embodiments, the sequence number/index $\overline{v}$=v+$\Delta$, where $\Delta$ is an integer, and $\Delta$=0, 1, $\ldots$ C−1.

In some embodiments, the parameter $f_{gh}$ related to group hopping can be determined according to legacy solutions. In some embodiments, $n_{ID}^{RS}$ is the identity for calculation of sequence group value, the value of $n_{ID}^{RS}$ may be configured by higher-layer or the cell identity (for example, $N_{ID}^{cell}$) by default.

At block 520, the first device 201 transmits, to the second device 202, the different RS sequences over the plurality of RS ports.

In some embodiments, the first device 201 may be a terminal device (for example, the terminal device 120 as shown in FIG. 1) and the second device 202 may be a network device (for example, the network device 110 as shown in FIG. 1). Alternatively, in other embodiments, the first device 201 may be a network device (for example, the network device 110 as shown in FIG. 1) and the second device 202 may be a terminal device (for example, the terminal device 120 as shown in FIG. 1).

In this way, embodiments of the present disclosure can enable DMRS transmission with low PAPR, even if more than one DMRS ports are supported for one UE for uplink transmission based on DFT-s-OFDM, or even if low PAPR DMRS sequences (e.g. DFT-s-OFDM) are introduced for downlink transmission.

Figure 6:
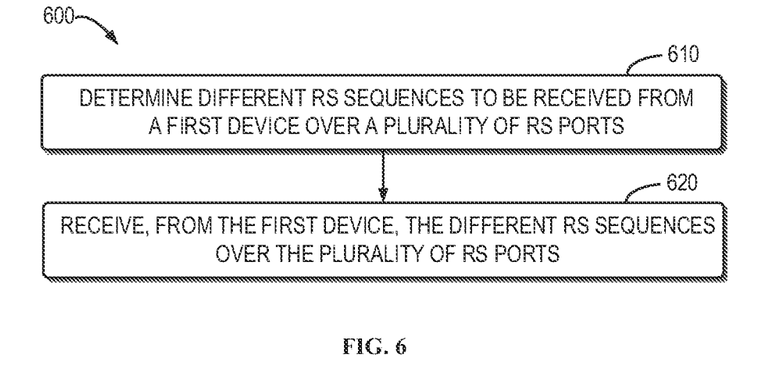
FIG. 6 illustrates a flowchart of an example method in accordance with some embodiments of the present disclosure.

FIG. 6 illustrates a flowchart of an example method 600 for RS transmission according to some embodiments of the present disclosure. The method 600 can be implemented at the second device 202 as shown in FIG. 2. It is to be understood that the method 600 may include additional blocks not shown and/or may omit some blocks as shown, and the scope of the present disclosure is not limited in this regard.

At block 610, the second device 202 determines different RS sequences to be received from the first device 201 over a plurality of RS ports.

In some embodiments, the plurality of RS ports are associated with same time resources, but different frequency resources and/or different comb offsets.

In some embodiments, one of the different RS sequences may comprise any of the following: a DMRS sequence, a SRS sequence, a PTRS sequence, a TRS sequence and a CSI-RS sequence.

In some embodiments, the different RS sequences comprise different DMRS sequences. The second device 202 may determine, based on different sequence group indices and/or different sequence numbers, different ZC sequences or different CGSs as the different DMRS sequences.

In some embodiments, the different RS sequences comprise different DMRS sequences. The second device 202 may determine, by initializing a pseudo-random sequence generator with different values, different pseudo-random sequences as the different DMRS sequences.

At block 620, the second device 202 receives, from the first device 201, the different RS sequences over the plurality of RS ports.

In some embodiments, the first device 201 may be a terminal device (for example, the terminal device 120 as shown in FIG. 1) and the second device 202 may be a network device (for example, the network device 110 as shown in FIG. 1). Alternatively, in other embodiments, the first device 201 may be a network device (for example, the network device 110 as shown in FIG. 1) and the second device 202 may be a terminal device (for example, the terminal device 120 as shown in FIG. 1).

Figure 7:
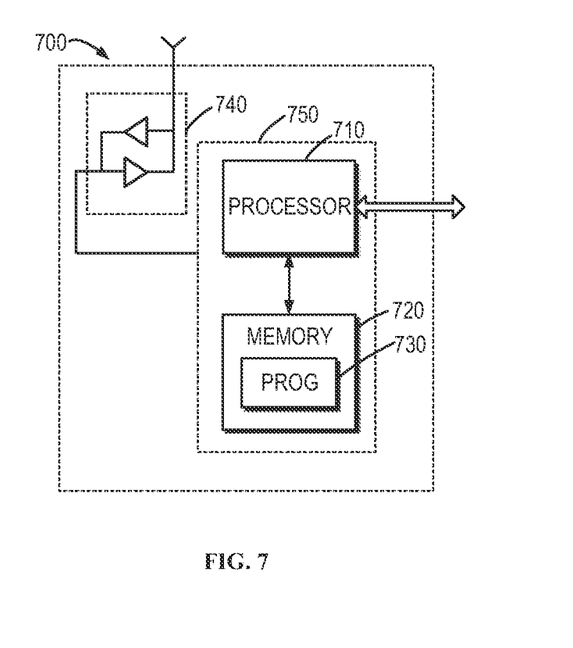
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 or the terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 6. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 750 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
generating a demodulation reference signal (DMRS) sequence based on a sequence group, wherein the sequence group is determined by a first parameter, wherein
the first parameter equals a second parameter when a first condition is satisfied, the second parameter is related to an identity associated with physical uplink shared channel (PUSCH) between the terminal device and a network device, the first condition comprises:
the second parameter is configured by a first higher layer parameter, the PUSCH is neither scheduled by random access response (RAR) uplink(UL) grant nor scheduled by downlink control information(DCI) format 0_0 with cyclic redundancy check (CRC) scrambled by temporary cell-radio network temporary identifier (TC-RNTI), and a second higher layer parameter related to transform precoding of the DMRS sequence is not configured;
the first parameter equals a third parameter when a second condition is satisfied, the third parameter is related to a scrambling identity, the second condition comprises:
the second higher layer parameter is configured, π/2-BPSK modulation is used for the PUSCH, and the PUSCH transmission is not a msg3 transmission, and
the first parameter equals a fourth parameter when neither the first condition nor the second condition is satisfied, the fourth parameter is related to a cell identity; and
transmitting the DMRS sequence to the network device.

2. The method of claim 1, wherein the sequence group is determined by $$u=(f_{gh}+n_{ID}^{RS})\bmod 30$$

wherein u is an index of the sequence group, $n_{ID}^{RS}$ the first parameter, $f_{gh}$ is a parameter related to group hopping.

3. The method of claim 1, wherein the first higher layer parameter is nPUSCH-Identity, and the second higher layer parameter is dmrs-UplinkTransformPrecoding.

4. The method of claim 1, wherein the second parameter is $n_{ID}^{PUSCH}$, the third parameter is $N_{ID}^{nSCID}$, and the fourth parameter is $N_{ID}^{cell}$.

5. A method performed by a network device, comprising:
determining a demodulation reference signal (DMRS) sequence based on a sequence group, wherein the sequence group is determined by a first parameter, wherein
the first parameter equals a second parameter when a first condition is satisfied, the second parameter is related to an identity associated with physical uplink shared channel (PUSCH) between a terminal device and the network device, the first condition comprises:
the second parameter is configured to the terminal device, the PUSCH is neither scheduled by random access response (RAR) uplink(UL) grant nor scheduled by downlink control information(DCI) format 0_0 with cyclic redundancy check (CRC) scrambled by temporary cell-radio network temporary identifier (TC-RNTI), and a second higher layer parameter related to transform precoding of the DMRS sequence is not configured to the terminal device;
the first parameter equals a third parameter when a second condition is satisfied, the third parameter is related to a scrambling identity, the second condition comprises:

the second higher layer parameter is configured to the terminal device, π/2-BPSK modulation is used for the PUSCH, and the PUSCH transmission is not a msg3 transmission, and the first parameter equals a fourth parameter when neither the first condition nor the second condition is satisfied, the fourth parameter is related to a cell identity; and receiving, from the terminal device, the DMRS sequence.

6. The method of claim 5, wherein the sequence group is determined by $$u = (f_{gh} + n_{ID}^{RS}) \bmod 30$$

wherein u is an index of the sequence group, $n_{ID}^{RS}$ the first parameter, $f_{gh}$ is a parameter related to group hopping.

7. The method of claim 5, wherein the first higher layer parameter is nPUSCH-Identity, and the second higher layer parameter is dmrs-UplinkTransformPrecoding.

8. The method of claim 5, wherein the second parameter is $n_{ID}^{PUSCH}$, the third parameter is $N_{ID}^{nSCID}$, and the fourth parameter is $N_{ID}^{cell}$.

9. A terminal device of communication comprising:
a processor; and
a memory coupled to the processor and storing instructions thereon, the instructions, when executed by the processor, causing the terminal device to perform the method according to claim 1.

10. A terminal device of communication comprising:
a processor; and
a memory coupled to the processor and storing instructions thereon, the instructions, when executed by the processor, causing the terminal device to perform the method according to claim 2.

11. A terminal device of communication comprising:
a processor; and
a memory coupled to the processor and storing instructions thereon, the instructions, when executed by the processor, causing the terminal device to perform the method according to claim 3.

12. A terminal device of communication comprising:
a processor; and
a memory coupled to the processor and storing instructions thereon, the instructions, when executed by the processor, causing the terminal device to perform the method according to claim 4.

* * * * *